(12) United States Patent
Englert (10) Patent No.: US 10,200,783 B2
(45) Date of Patent: Feb. 5, 2019

(54) TRANSPORTABLE LOUDSPEAKER SYSTEM HAVING A LARGE SOUND AND RESONANCE VOLUME ON THE BASIS OF A SOUND PANEL WITH REFLECTION AND RESONANCE EFFECT

(71) Applicant: Klaus Englert, Alzenau (DE)

(72) Inventor: Klaus Englert, Alzenau (DE)

( * ) Notice: Subject to any disclaimer, the term of this patent is extended or adjusted under 35 U.S.C. 154(b) by 0 days.

(21) Appl. No.: 15/569,929

(22) PCT Filed: Apr. 14, 2016

(86) PCT No.: PCT/EP2016/058200
§ 371 (c)(1),
(2) Date: Oct. 27, 2017

(87) PCT Pub. No.: WO2016/173855
PCT Pub. Date: Nov. 3, 2016

(65) Prior Publication Data
US 2018/0160219 A1     Jun. 7, 2018

(30) Foreign Application Priority Data
Apr. 28, 2015   (DE) .................... 20 2015 102 126 U (51) Int. Cl.
*H04R 1/28*      (2006.01)
*G06F 1/16*      (2006.01)
(Continued)

(52) U.S. Cl.
CPC ............ *H04R 1/2811* (2013.01); *A45C 11/00* (2013.01); *A45C 15/00* (2013.01); *G06F 1/1605* (2013.01);
(Continued)

(58) Field of Classification Search
CPC .. H04R 1/2811; H04R 1/028; H04R 2499/11; H04R 2499/15; A45C 11/00; A45C 15/00; A45C 2011/003; G06F 1/1605
See application file for complete search history.

(56) References Cited

U.S. PATENT DOCUMENTS

| 4,607,747 A | 8/1986 | Steiner |
| 6,040,978 A | 3/2000 | Spencer |

(Continued)

FOREIGN PATENT DOCUMENTS

| DE | 20 2011 051 426 U1 | 2/2012 |
| DE | 20 2012 100 042 U1 | 2/2012 |

(Continued)

OTHER PUBLICATIONS

International Search Report of PCT/EP2016/058200, dated Jul. 11, 2016.
(Continued)

*Primary Examiner* — Tuan D Nguyen
(74) *Attorney, Agent, or Firm* — Collard & Roe, P.C.

(57) ABSTRACT

A speaker system having a first plate-like component, which has at least one speaker, and a second plate-like component, which is fastened to the first component so that it is pivotable about a first pivot axis, the system having at least one third component which is fastened to the second component so that it is pivotable about a second pivot axis, the pivot axes each being positioned on lateral edges of the components and preferably being at right angles to one another.

14 Claims, 7 Drawing Sheets

(51) Int. Cl.
*H04R 1/02* (2006.01)
*A45C 15/00* (2006.01)
*A45C 11/00* (2006.01)
*H04N 5/64* (2006.01)

(52) U.S. Cl.
CPC ........ *H04R 1/028* (2013.01); *A45C 2011/003* (2013.01); *H04N 5/642* (2013.01); *H04R 2499/11* (2013.01); *H04R 2499/15* (2013.01)

(56) References Cited

U.S. PATENT DOCUMENTS

| | | | |
|---|---|---|---|
| 6,298,990 | B1 | 10/2001 | Amrod et al. |
| 2011/0266194 | A1 | 11/2011 | Bau |
| 2011/0297566 | A1* | 12/2011 | Gallagher ............ F16M 11/105 206/320 |
| 2012/0194448 | A1* | 8/2012 | Rothkopf ............. A45C 13/002 345/173 |
| 2013/0004012 | A1 | 1/2013 | Huang |
| 2014/0183068 | A1* | 7/2014 | Rohrbach ................ A45C 9/00 206/45.24 |

FOREIGN PATENT DOCUMENTS

| | | |
|---|---|---|
| EP | 2 383 965 A1 | 11/2011 |
| GB | 2 382 256 A | 5/2003 |
| WO | 99/27433 A1 | 6/1999 |
| WO | 2014/107702 A1 | 7/2014 |
| WO | 2014/147410 A1 | 9/2014 |

OTHER PUBLICATIONS

Fink, Howard. "Sounder Stand: Natural amplifier for your iPad/iPhone." Kickstarter, retrieved on Oct. 26, 2017 from https://www.kickstarter.com/projects/1034665231/the-sounder-natural-amplifier-for-the-ipad, 11 pages.

Selleck, Evan. "iBox is $25 Worth of Wood to Hold your iPad." Slash Gear, Jun. 28, 2010, retrieved on Oct. 26, 2017 from http://www.slashgear.com/ibox-is-25-worth-of-wood-to-hold-your-ipad-2891869/, 6 pages.

* cited by examiner

TRANSPORTABLE LOUDSPEAKER SYSTEM HAVING A LARGE SOUND AND RESONANCE VOLUME ON THE BASIS OF A SOUND PANEL WITH REFLECTION AND RESONANCE EFFECT

CROSS REFERENCE TO RELATED APPLICATIONS

This application is the National Stage of PCT/EP2016/058200 filed on Apr. 14, 2016, which claims priority under 35 U.S.C. § 119 of German Application No. 20 2015 102 126.7 filed on Apr. 28, 2015, the disclosures of which are incorporated by reference. The international application under PCT article 21(2) was not published in English.

BACKGROUND OF THE INVENTION

The invention relates to a speaker system, having a first plate-like component which has at least one speaker, and a second plate-like component which is fastened to the first component so that it is pivotable about a first pivot axis.

Many electronic entertainment devices, such as mobile telephones, MP3 players and tablet computers, are becoming more and more compact and light, and can therefore be carried along constantly by a user. Such devices often have a speaker, since the user may wish for example to listen to music, watch films and play games using such devices. However, because of their compact construction only very small speakers are built into such devices, causing the sound quality to suffer, particularly in the bass range.

Tablet computers in particular are replacing classic desktop PCs, and especially laptops and notebooks, to an increasing degree. However, they have some disadvantages due to their structure. First, the sensitive screen is exposed on an external surface, and therefore may easily be scratched or even destroyed.

Second, the angle of the screen cannot be tilted to face in the direction of the user, as with a laptop, since the screen and housing are a single rigid piece. Instead, the tablet computer either lies flat on a support surface or must be held in the hand when in use. Furthermore, because of the compact construction, in tablet computers also only very small speakers are installed. Because of these structural limitations, a large number of accessories exist in order to remedy these disadvantages, or at least to decrease them.

Supporting and protective devices for tablet computers are known in a multitude of different designs. A combination of protective case and upright support is known for example from EP 2 383 965 A1. Another computer supporting device with the function of a carrying case is disclosed by DE 20 2011 051 426 U1. A stable housing having a device for setting up the tablet computer contained in it is known from DE 20 2012 100 042 U1.

Devices for improving the sound properties of a tablet computer are also adequately known. These direct the sound waves produced for example on the back side of a tablet computer toward the front to the user, as for example in the case of the sound guide cover in US 2013/0004012 A1 or the multifunction cover in WO 2014/147410 A1.

Other variants extend the integrated speakers of a tablet computer by adding a sound and resonance volume in order to improve the sound properties, as known for example from the "Sounder Stand" (https://www.kickstarter.com/projects/1034665231/the-sounder-natural-amplifier-for-the-ipad). A greater sound volume than the "Sounder Stand" is offered by the "iBox," a tablet computer holder designed as a wooden box (http://www.slashgear.com/ibox-is-25-worth-of-wood-to-hold-your-ipad-2891869/). While the variants having sound volume deliver the greatest improvement in sound properties, they have the crucial disadvantage that they have bulky and heavy construction. They are therefore not suitable for always being taken along with the tablet computer, which is distinguished specifically by its compact construction and light weight.

SUMMARY OF THE INVENTION

The task is therefore to create a portable speaker system that possesses good sound quality, particularly also in the bass range, and yet has compact and light-weight construction.

The above object is fulfilled by a speaker system of the type named at the beginning, that has at least one third component which is fastened to the second component so that it can pivot about a second pivot axis, the pivot axes each being located on lateral edges of the components and preferably at right angles to one another.

A speaker system delivers good sound quality when it has sound volume and resonance volume, in addition to the actual speaker. To create a resonance body that forms the resonance volume, at least three side walls are needed. The three side walls, which according to the invention are designed as plate-like components, and the base surface form for example a prism with a triangular base surface and a face that is open on one side. A particular advantage of the speaker system according to the invention lies in the fact that the second and third components can also serve as a support for the first component, because of their pivotability and the arrangement of the pivot axes. It is thus possible to keep the first component, for example a tablet computer, in a desired position by means of the other two components.

In order to design such a speaker system so that it is also portable, the parts of the resonance body may have hinges or other pivotable connections. That enables the parts to be folded together in such a way that a flat condition is produced, in which the plate-like components are arranged essentially parallel to one another and one on top of the other. In such a state, the speaker system may be stored easily and compactly.

In a raised state, in which the parts form the resonance volume, the components are at an acute, right or obtuse angle to one another.

In this raised state, the second and the third components serve as a supporting device for the first component, in order to set the first component up at a defined angle. This is particularly advantageous if, besides the speaker, the first component also has a display for depicting content. If a user wants to look at this display, it should face toward the user. The rise angle, that is, the angle formed by the first component relative to the base, may be chosen flatter or steeper depending on the purpose.

In order to be able to form a resonance volume by the components and a base in a raised state, the components must each have one of their lateral edges lying in a plane. If the system is placed on a base, then the surface of this base must lie in that plane, so that the components close flush with that plane.

According to the invention, the speaker of the first plate-like component may be located on a lateral edge of the component. This lateral edge preferably is beveled or rounded, so that the opening of the speaker in the raised state is not closed off by other components which are in contact with this lateral edge, but is directed into the interior of the volume.

In another embodiment, other components in addition to the first component may have one or more speakers. Every speaker that has its opening directed into the volume formed by the components contributes to the total sound of the speaker system.

In a preferred embodiment, the basic form of the third component is triangular. One edge of the component, the bottom edge, lies in the plane, and thus forms the connection to a base. The front edge of the third component abuts on the first component, and the rear edge abuts on the second component. The angle between bottom edge and front edge is thus identical to the rise angle of the first component, and the angle between the bottom edge and the rear edge corresponds to the angle of inclination of the first component.

In order to achieve especially high stability in the raised state, the angle of inclination of the second component, that is, the angle of the third component between the bottom edge and the rear edge, may be smaller than 90°.

In order to achieve an especially good resonance effect, it is important for the sound volume to have essentially only one opening. It is therefore important that the components fit as tightly together as possible. In order to achieve this, the pivotable connection according to the invention between the third component and the second component may be designed as a spring-assisted hinge. That causes the third component to be held in contact with the first component by a spring.

Alternatively or additionally, the connection between the first and the third component may also be secured magnetically. If the first component has ferromagnetic properties, the magnet draws the third component flush against the first component, and thus results in a completely closed connection.

The connection between this third component and the second component may also occur according to the invention by a clamping strip with hinge. The hinge provides for the foldability of the connection, and the clamping strip make it possible to join and separate the connection reversibly. The hinge and clamping strip may also be formed as one unit.

If the connection is to be long-term, the second and third components may also be made in a single piece. The pivotability at the connecting point is achieved in this case for example by a reduced thickness in the nature of a film hinge and/or a flexible material.

A preferred embodiment includes the provision that in a flattened state the second component and the third component do not simply lie one on top of the other, but rather the second component has a suitable recess for the third component. In this case the thickness of the region of the second component is reduced, for example by exactly the amount of the thickness of the third component. That enables the recess to be filled by the third component. The recess may also be somewhat larger than the third component, in order to enable problem-free folding and unfolding.

If a user wishes to change the parts from a folded to an unfolded state, it must be possible to grasp the third component. To that end, there may also be provision to enlarge the recess in the second component, for example at the position of the tip of the third component, in such a way that the third component can be gripped with two fingers.

According to the invention, the second component may be made up for example of multiple segments, which are joined together with articulated connections. For example, in a raised state one segment may be folded in, in order to thereby reduce the effective size of the second component. This makes it possible to achieve a low rise angle without at the same time obtaining too flat an angle of inclination.

In another embodiment, the rear edge of the third component has the same length as the edge of the second component which is connected to it. Accordingly, that creates an especially large resonance volume.

According to the invention, the first component may be a tablet computer. In most versions, the latter has the needed speaker in a position according to the invention. At the same time, the second component is designed as a protective cover for the tablet computer, and therefore is essentially congruent to the tablet computer. For typical tablet computers with a protective cover, one therefore needs only the third plate-like component in order to obtain a speaker system according to the invention.

Since many users already possess a protective and supporting device for a tablet computer, there is provision to augment these devices with the third component. To that end, in one embodiment the third component has on its rear edge a clamping strip with hinge, which may be attached to an existing protective and supporting device in order to create a system according to the invention. Since such a connection by means of a clamping strip is completely reversible, the third component may be attached and removed at will. Since it can also be folded away compactly by means of the hinge, removal each time the protective and supporting device is folded together is absolutely unnecessary.

Another embodiment of the invention has a fourth plate-like component, which lies at the level of the base, and thus closes off the resonance volume in place of the base. That creates a resonance volume even without a flat base. This is particularly advantageous when a flat base is unavailable. Furthermore, besides the first plate-like component, preferably at least one other component also has speakers which project into the volume defined by the components.

There is provision here, even without the fourth component, for there to be a speaker system according to the invention, which has a rechargeable or regular battery, in order to be functional independent of an external power supply. The fourth component serves in this case as the charging station for the battery, and to that end may be attached and removed reversibly. The system may be converted to a folded state without the fourth component, for transport.

Another embodiment is a cube-shaped speaker system, wherein four plate-like components form the lateral faces of a cube, and a base surface is closed off by another plate-like component. The form of this embodiment of the invention may also be modified so that the base surface has for example the shape of a parallelogram, and the arrangement of the other components is adapted thereto. The base surface may also be any n-sided figure, where the speaker system accordingly has in addition n plate-like components which form the lateral faces.

According to the invention, the form of the speaker system may, also be that of a cylinder, where a cylindrical component contains the at least one speaker, and this cylinder is closed off at one of its ends by a plate-like component. In principle, the base surface may also have any other shape, and the one component that forms the volume has a shape matched thereto.

BRIEF DESCRIPTION OF THE DRAWINGS

The invention will be explained in greater detail below on the basis of exemplary embodiments, with reference to the figures. All of the described and/or pictorially depicted features, by themselves or in any combination, constitute the object of the invention, even independent of how they are combined in the claims or their antecedents.

The figures show the following.

DETAILED DESCRIPTION OF THE INVENTION

In the exemplary embodiments in FIGS. 1 through 9, the first component is for example a tablet computer, and the second component is an associated protective and supporting device. The invention is not limited to these embodiments, however. Rather, the first component may be any other plate-like element having at least one speaker.

Figure 1:
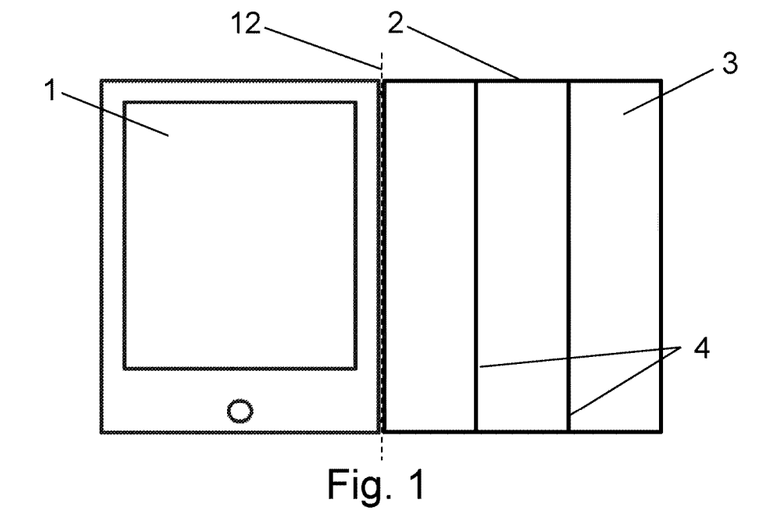
FIG. 1 a top view of a tablet computer having a protective cover.

FIG. 1 shows a top view of a tablet computer 1 having a protective cover 2 known from the existing art, which may be folded over the screen in order to protect the latter from damage. Such a protective cover 2 may be made up of a plurality of segments 3, which are connected to each other in such a way that they are foldable at the connecting points 4.

Figure 2:
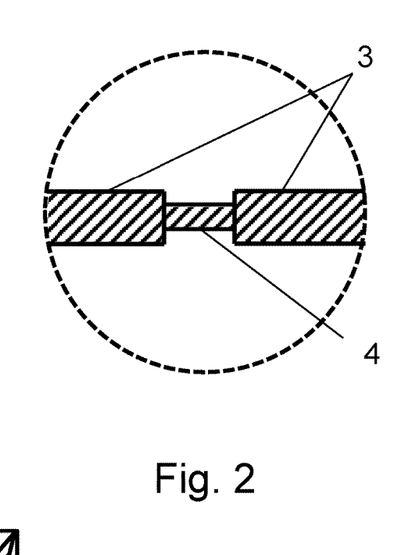
FIG. 2 a cross section through a protective cover.
Figure 3:
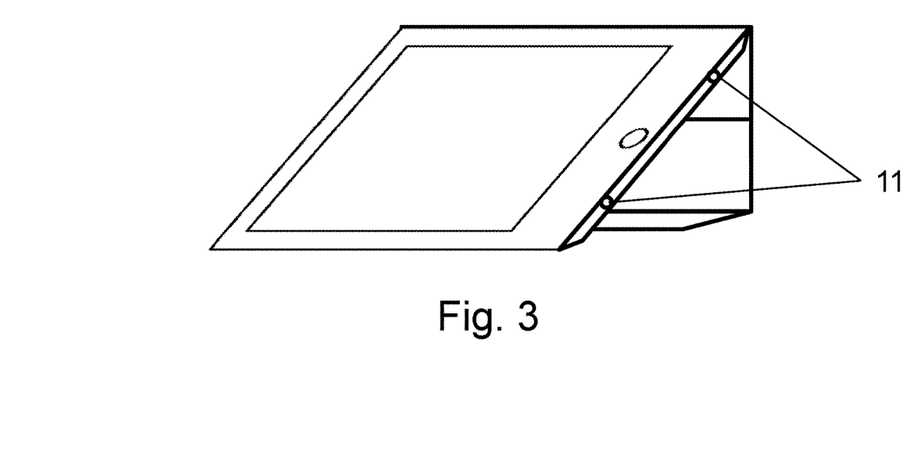
FIG. 3 a perspective view of a raised protective and supporting device with a tablet computer.

A foldable connection is typically realized by thin, pliable material between the segments 3. This is shown in FIG. 2 in a cross section through such a protective cover 2.

By refolding these segments 3, the protective cover 2 may be made into a supporting device for the tablet computer 1. Using this, the tablet computer 1 may be raised at an angle, as can be seen in the perspective view in FIG. 3. Such protective and supporting devices are known from the prior art. In addition, the tablet computer has two speakers 11 at its lateral edge.

Figure 4:
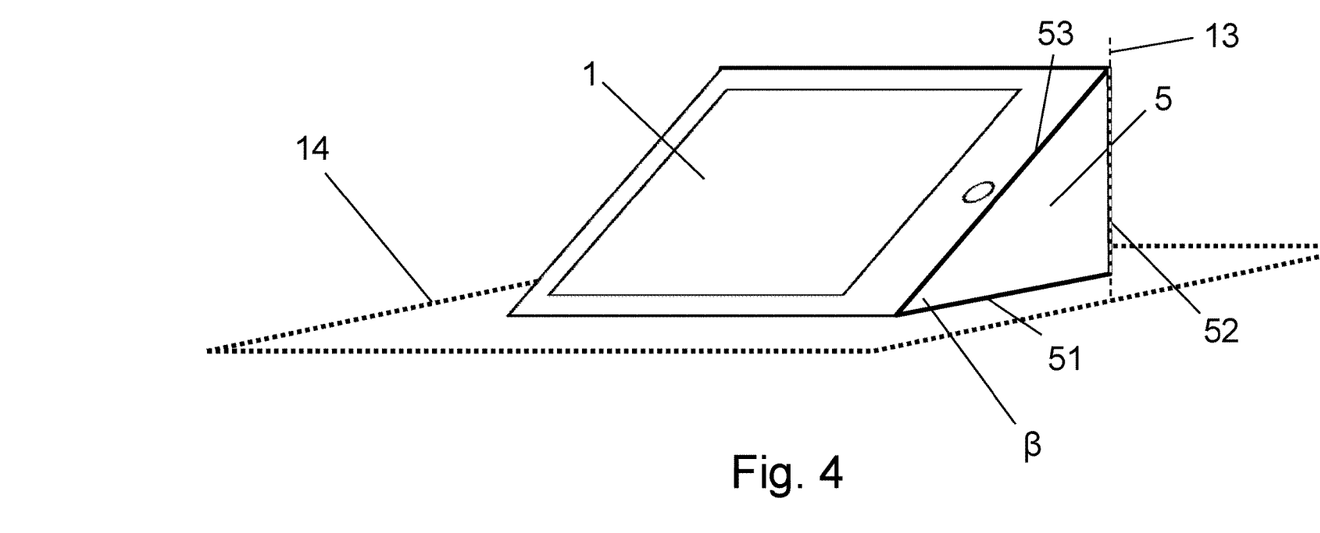
FIG. 4 a perspective view of a system according to the invention.

FIG. 4 shows a perspective view of a device according to the invention, consisting of the tablet computer 1, the protective cover 2 and a third plate-like component 5, which is referred to hereinafter by way of example as sound panel 5. The tablet computer 1, protective cover 2 and sound panel 5 each have one of their lateral edges in the plane 14.

In the embodiment depicted in FIG. 4, the sound panel 5 is triangular and has a bottom edge 51, a rear edge 52 and a front edge 53. The sound panel 5 is attached at its rear edge 52 to the protective cover 2, stands with its bottom edge 51 on the base lying in the plane 14, and has its front edge 53 in contact with the tablet computer 1. As a result, in the raised state the protective cover 2, sound panel 5, tablet computer 1 and base form a volume which is open in only one partial surface. The open partial surface of this volume is on the side opposite the sound panel 5.

A tablet computer 1 typically has its speaker openings 11 inside this volume, whereby this volume functions as a sound and resonance volume for the speakers 11 and thus results in a clear improvement of the sound properties of the tablet computer 1. The rise angle β of the tablet computer 1 specified by the angle of the sound panel 5 between front edge 53 and bottom edge 51 may be any desired acute angle, and thus may create a protective device for very flat to very steep rise angles β of the tablet computer 1, depending on need.

Figure 5:
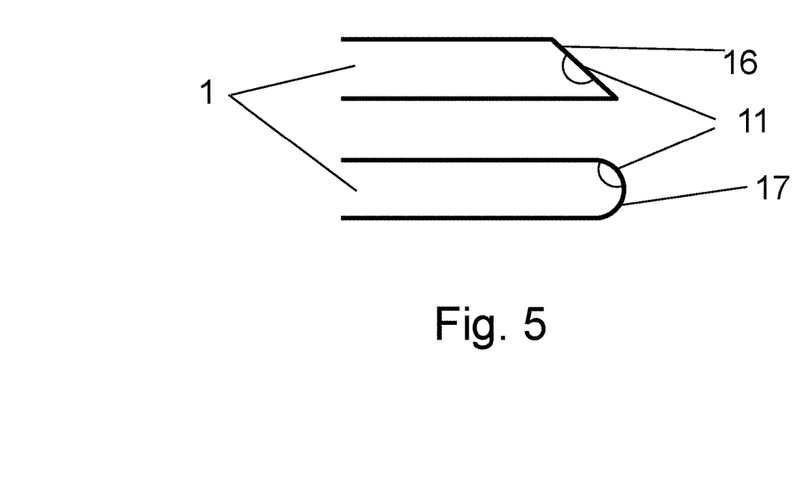
FIG. 5 cross section through a first component.

Since the sound panel 5 lies against the lateral edge of the tablet computer 1 having the speakers 11, the sound panel would close off the speaker openings. In order to prevent this, the lateral edge of the tablet computer 1 may have either a bevel 16 or a rounding 17, as shown in FIG. 5. As a result, the opening of the loudspeakers 11 lies inside the volume defined by the components 1, 2, 5.

Figure 6:
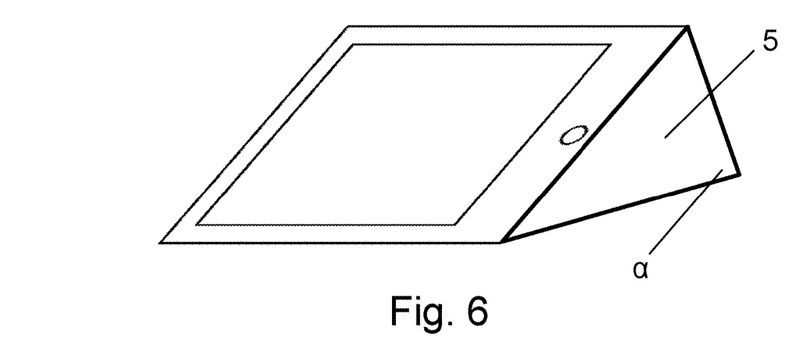
FIG. 6 another perspective view of a system according to the invention.

A preferred embodiment of the invention is depicted in a perspective view in FIG. 6. In this embodiment, the sound panel 5 has an angle of inclination α smaller than 90° between bottom edge 51 and rear edge 52, whereby the sound panel 5 and the protective cover 2 connected to it acquire an angle of inclination α to the surface normal of the base. This angle of inclination α provides for increased stability, especially with embodiments having steep rise angles β for the tablet computer.

Figure 7:
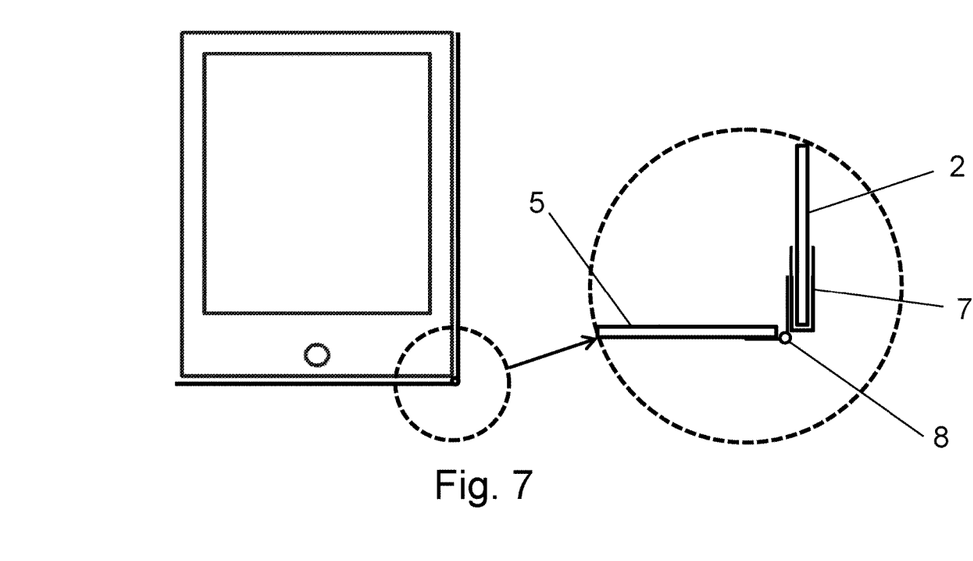
FIG. 7 a top view with detail of a system according to the invention.

In a preferred embodiment, the connection between sound panel 5 and protective cover 2 is produced by means of a hinge clamping strip 7, 8, as illustrated in FIG. 7 in a top view and detail. The hinge clamping strip 7, 8 is connected permanently to the sound panel, and is designed to be attached to the lateral edge of the protective cover 2, which produces a reversible, foldable connection between sound panel 5 and protective cover 2. The clamping strip 7 and hinge 8 are designed in this case as one unit. This simple and reversible connection makes it possible to attach the sound panel 5 quickly to an existing protective cover 2, in order to obtain a device according to the invention. The clamped connection does not have to be detached when the protective cover 2 is folded in front of the screen, because the sound panel 5 can be folded in easily by means of the hinge 8, in order to be stored compactly.

Figure 8:
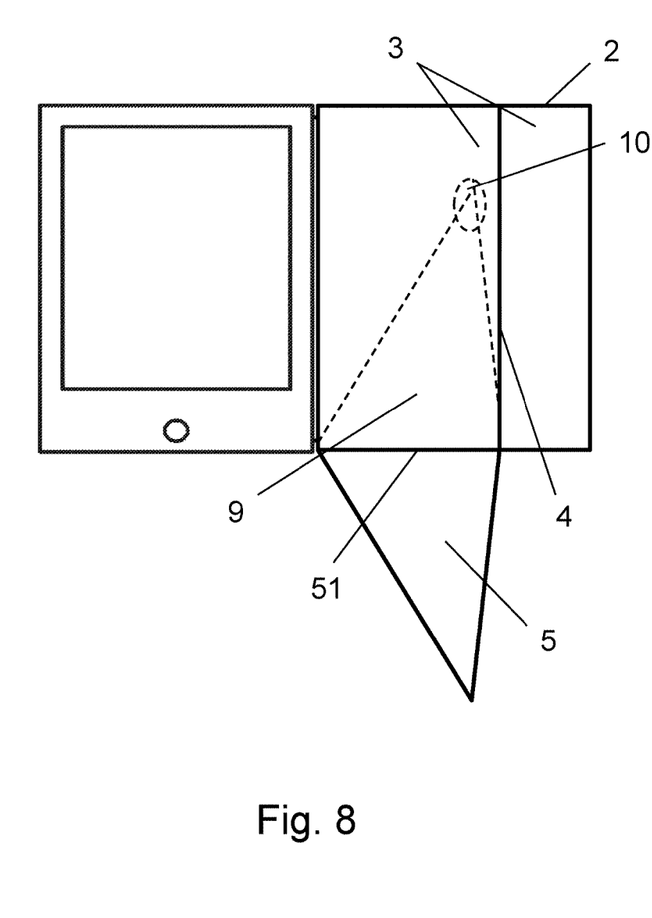
FIG. 8 a top view of a system according to the invention.

FIG. 8 shows a preferred embodiment of the invention in a top view, in which the protective cover 2 and sound panel 5 are produced in one piece. The protective cover 2 consists here of two segments 3, with the fold 4 located at the position of the bottom edge 51 of the sound panel 5. A recess 9 in the shape of the sound panel 5 is formed in the protective cover 2, so that the sound panel 5 fits when folded into the cover. To make it easier for the user to grip the sound panel, another indentation 10 is made in the protective cover at the position of the tip of the sound panel 5.

Figure 9A:
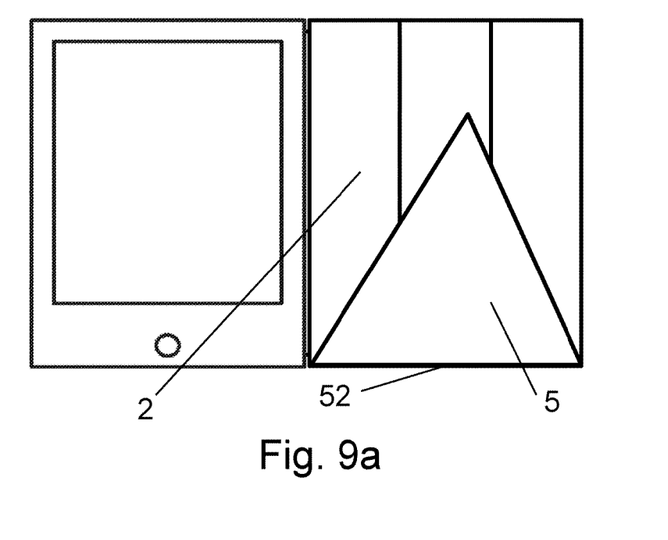
FIG. 9 another top view and perspective view of a system according to the invention.
Figure 9B:
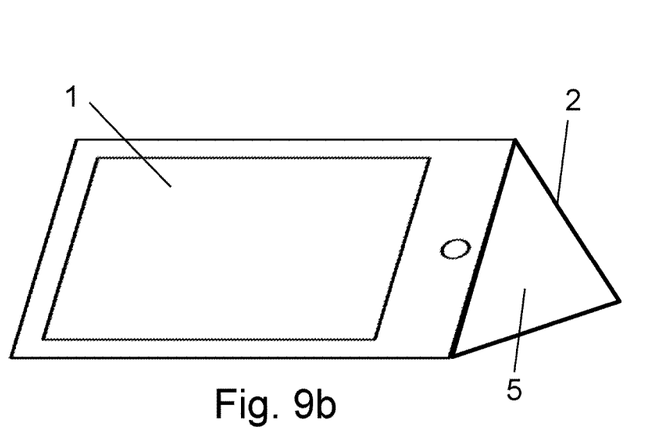

FIG. 9 shows a preferred embodiment of the invention in top view (FIG. 9a) and a perspective view in the raised state (FIG. 9b), in which the rear edge 52 of the sound panel 5 has the full width of the protective cover 2. That makes it possible to create an especially large sound and resonance volume.

Another embodiment of the invention, depicted in FIG. 10, has a fourth plate-like component 30, which lies for example at the level of the base, and thus closes off the resonance volume in place of the base. Furthermore, in the example in FIG. 10, besides the first plate-like component 1 the components 2 and 30 also each have speakers 111, which project into the volume defined by the components 1, 2, 30, 5.

Figure 10A:
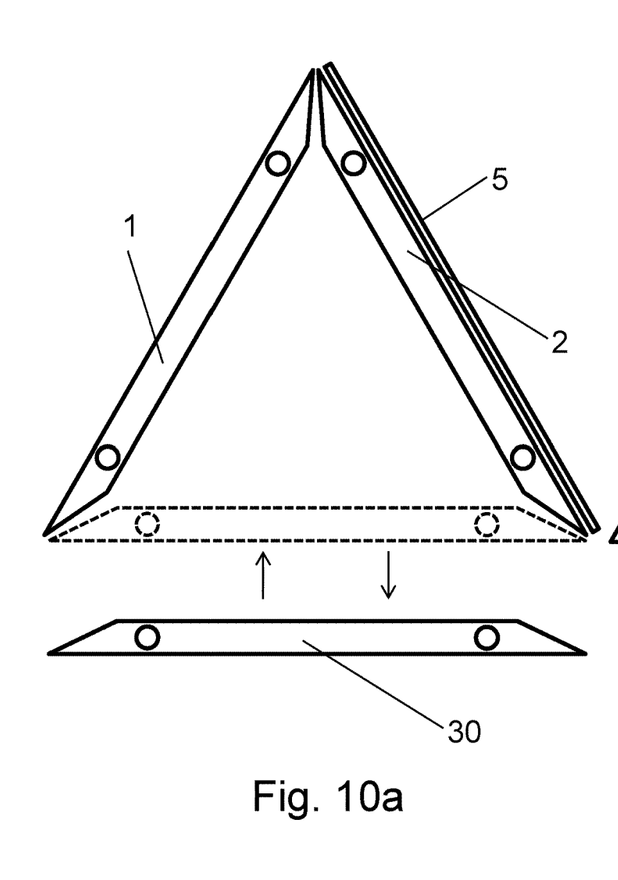
FIG. 10 side view of a system according to the invention with and without a third component, and cross section through a system according to the invention in the folded state.
Figures 10B, 10C:
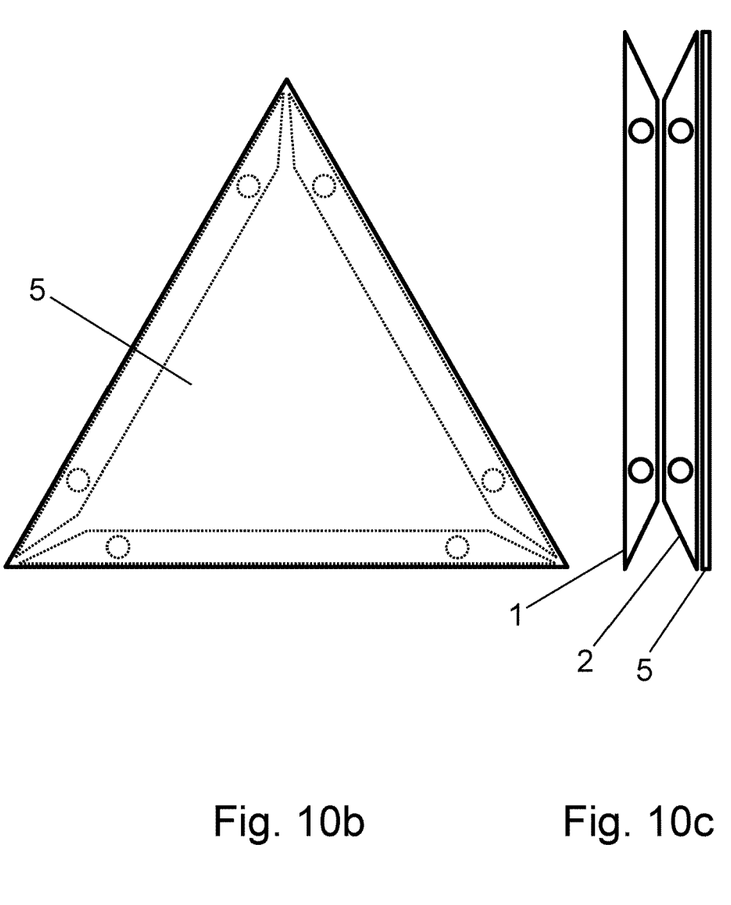

FIG. 10a shows the system in side view, with the sound panel 5 still lying on the second component 2. FIG. 10b shows the system in side view, with the sound panel 5 pivoted into a position which closes off the sound volume on one side. FIG. 10c shows the system in a transport or storage state, in which the components 1, 2 and 5 are lying on top of one another.

It is provided here that the components 1, 2, 5 already form a speaker system according to the invention, which has a rechargeable or regular battery, in order to be functional independent of an external power supply. The fourth component serves in this case as the charging station for the battery, and to that end may be attached and removed reversibly. The system may be converted to a folded state without the fourth component, for transport.

Figure 11A:
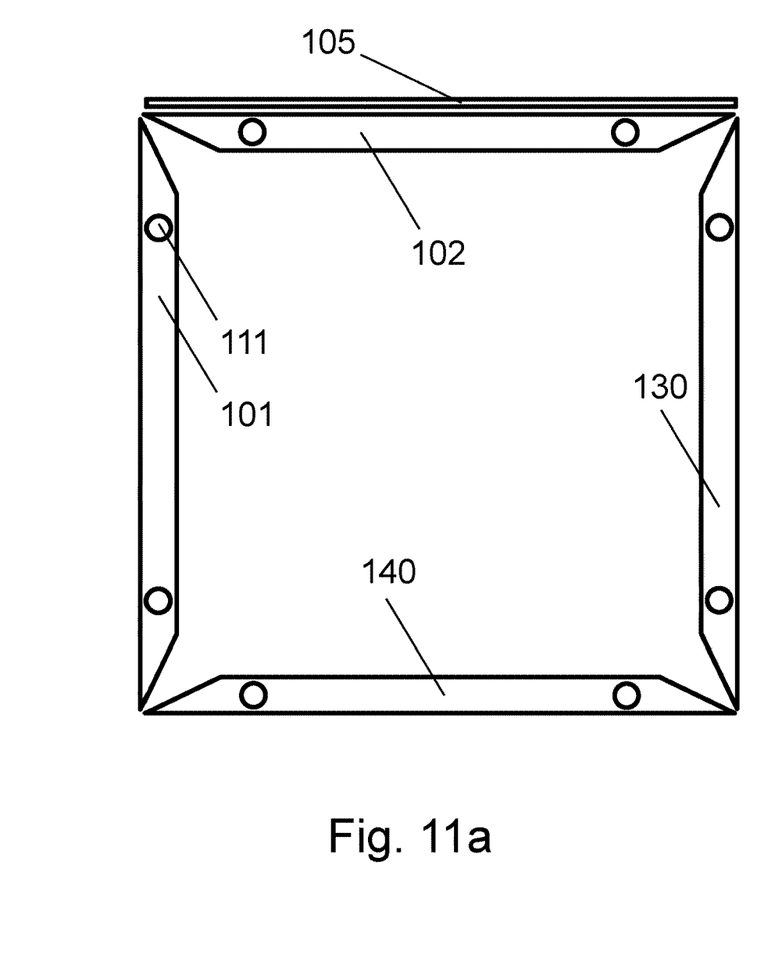
FIG. 11 side view of a system according to the invention with and without a third component.
Figure 11B:
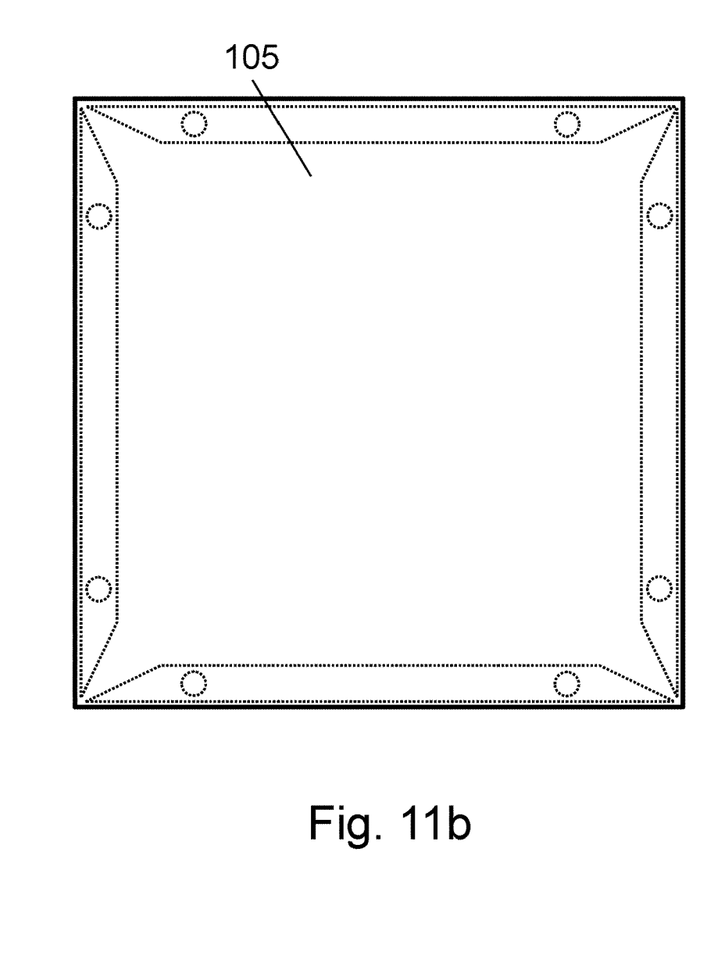

Another embodiment is a cube-shaped speaker system, depicted in FIG. 11, where the plate-like components 101, 102, 130, 140 form the lateral faces of the cube and a base surface is closed off by the plate-like component 105. FIG. 11a shows the system in side view, with the sound panel 105 still lying on the second component 102. FIG. 11b shows the system in side view, with the sound panel 105 pivoted into a position which closes off the sound volume on one side.

The form of this embodiment may also be modified so that the component 105 for example has the shape of a parallelogram, and the arrangement of the other components is adapted thereto. The component 105 may also be any n-sided figure, where the speaker system accordingly has in addition n plate-like components which form the lateral faces.

Figure 12A:
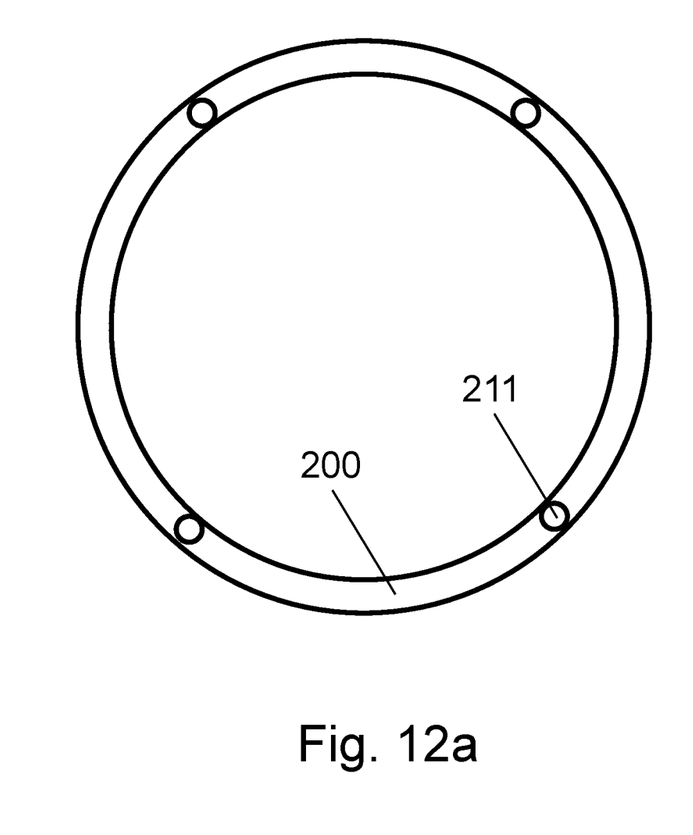
FIG. 12 side view of a system according to the invention with and without a component closing the end.
Figure 12B:
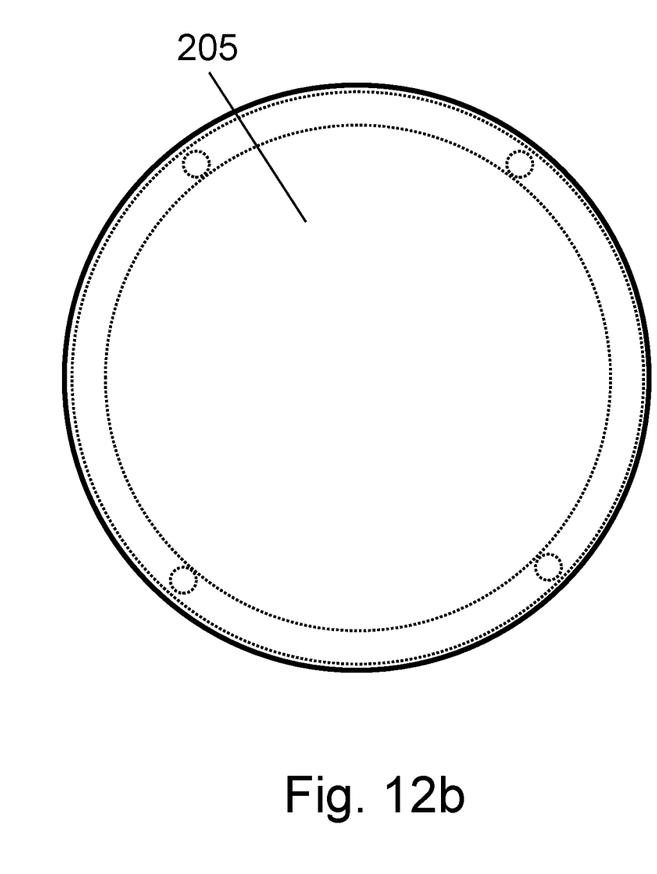

According to the invention, the form of the speaker system may also be that of a cylinder, where a cylindrical component 200 contains the at least one speaker 211, and this cylinder 200 is closed off at one of its ends by a plate-like component 205. In principle, the plate-like component 205 may also have any other shape, and the component 200 has a shape matched thereto. FIG. 12a shows the system in side view without the sound panel 205. FIG. 12b shows the system in side view, with the sound panel 205 pivoted into a position which closes off the sound volume on one side.

Because of the construction of the plate-like components, the speaker system according to the invention may be folded together and thus stored compactly for transport. At the same time, in a raised state it forms a resonance volume which provides for good sound quality.

REFERENCE LABELS 1 tablet computer
2 protective cover
3 segment
4 connecting point
5 sound panel
7 clamping strip
8 hinge
9 recess for sound panel
10 indentation for gripping the sound panel
11, 111, 211 speaker
12 first pivot axis
13 second pivot axis
14 plane
16 beveled edge
17 rounding
30 fourth component
51 bottom edge of sound panel
52 rear edge of sound panel
53 front edge of sound panel
101 first plate-like component
102 second plate-like component
105 fifth plate-like component
130 third plate-like component
140 fourth plate-like component
200 cylindrical component
205 plate-like component
α angle of inclination
β rise angle

The invention claimed is:

1. A speaker system having a first plate-like component (1; 101), which has at least one speaker (11), and a second plate-like component (2; 102), which is fastened to the first component (1; 101) so that it is pivotable about a first pivot axis (12), wherein the system has at least one third component (5; 105; 205) which is fastened to the second component (2; 102) so that it is pivotable about a second pivot axis (13), the pivot axes (12, 13) each being positioned on lateral edges of the components (1, 5; 101, 102, 105; 201, 205), wherein the first component (1; 101), the second component (2; 102) and the third component (5; 105; 205) are changeable from a flat-lying state, in which the first, second and third components (1, 2, 5; 101, 102, 105) are aligned parallel to one another, to a raised state, in which the first, second and third components (1, 2, 5; 101, 102, 105) each form an acute, right or obtuse angle relative to one another, and wherein the shapes of the components (1, 2, 5; 101, 102, 105) and the arrangement of the pivot axes (12, 13) are chosen so that the components (1, 2, 5; 101, 102, 105) in the raised state each have one of their lateral edges in a plane (14), where the components (1, 2, 5; 101, 102, 105) together with the plane (14) define a volume which is open on the side opposite the third component (5; 105; 205), wherein the at least one speaker (11) of the first component (1; 101; 201) is positioned on a lateral edge of the first component (1; 101; 201), and the lateral edge of the second component (1; 101; 201) having the speaker (11) has a beveled edge (16) or rounding (17), so that the opening of the speaker (11) is directed into the interior of the volume.

2. The speaker system according to claim 1, wherein the shapes of the components (1, 2, 5; 101, 102, 105) and the arrangement of the pivot axes (12, 13) are chosen so that in the raised state the second component (2; 102) and the third component (5; 105; 205) serve as a supporting device for the first component (1; 101).

3. The speaker system according to claim 1, wherein at least one other component (2, 5; 102, 105; 205) has at least one other speaker (11, 111) on a lateral edge, so that an opening of the other speaker (11, 111) is directed into the interior of the volume.

4. The speaker system according to claim 3, wherein the third component (5; 105; 205) has a triangular basic form, with a bottom edge (51) which is located in the plane (14) in the raised state, a rear edge (52) which abuts on the second component (2; 102), and a front edge (53) which abuts on the first component (1; 101; 201).

5. The speaker system according to claim 4, wherein the angle of inclination (a) between the bottom edge (51) of the third component (5; 105; 205) and the rear edge (52) of the third component (5; 105; 205) is smaller than 90°.

6. The speaker system according to claim 4, wherein the rear edge (52) of the third component (5; 105; 205) has the same width as the edge of the second component (2; 102) which is connected to it.

7. The speaker system according to claim 1, wherein a pivotable connection between the third component (5; 105; 205) and the second component (2; 102) is a spring-assisted hinge (8).

8. The speaker system according to claim 1, wherein a connection between the third component (5; 105; 205) and the second component (2; 102) has a clamping strip (7) with hinge (8).

9. The speaker system according to claim 1, wherein the third component (5; 105; 205) and the second component (2; 102) are connected together in a single piece.

10. The speaker system according to claim 9, wherein the second component has a region (9) of reduced thickness, whose size and shape are at least the size and shape of the third component (5; 105; 205).

11. The speaker system according to claim 1, wherein the second component (2; 102) has a plurality of segments (3), which are connected with an articulated connection.

12. The speaker system according to claim 1, wherein the first component (1; 101; 201) is a tablet computer and the second component (2; 102) is a protective cover for a tablet computer.

13. The speaker system according to claim 1, wherein the system has a fourth component (30; 130); in the raised state a lateral edge of the first component (1; 101) is in contact with a first lateral edge of the fourth component (30; 130), a lateral edge of the second component (2; 102) is in contact with a second lateral edge of the fourth component (30; 130) which is located opposite the first lateral edge, and a lateral edge of the third component (5; 105) is in contact with a third lateral edge of the fourth component (30; 130).

14. The speaker system according to claim 1, wherein the system has a fourth component (130) and a fifth component (140), where the five components enclose a cube which is open on one side.

\* \* \* \* \*